US011422835B1

(12) United States Patent
Ramanathan et al.

(10) Patent No.: US 11,422,835 B1
(45) Date of Patent: Aug. 23, 2022

(54) DYNAMIC USER INTERFACE SYSTEMS AND DEVICES

(71) Applicant: Wells Fargo Bank, N.A., San Francisco, CA (US)

(72) Inventors: Ramanathan Ramanathan, Bellevue, WA (US); Chris Theodore Kalaboukis, San Jose, CA (US); Andrew J. Garner, IV, State Road, NC (US); Abhijit Rao, Irvine, CA (US); Andres J. Saenz, Redmond, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 17/070,320

(22) Filed: Oct. 14, 2020

(51) Int. Cl.
*G06F 17/00* (2019.01)
*G06F 9/451* (2018.01)
*H04L 67/02* (2022.01)
*H04L 67/141* (2022.01)

(52) U.S. Cl.
CPC .............. *G06F 9/451* (2018.02); *H04L 67/02* (2013.01); *H04L 67/141* (2013.01)

(58) Field of Classification Search
CPC ........ G06F 9/451; G06F 3/0487; G06F 3/011; G06F 40/186; G06F 40/106; G06F 21/60; G06F 21/6245; G06F 3/013; G06F 3/147; G06F 3/0412; H04L 67/02; H04L 67/141; G06K 9/6228; G06K 9/6256; G06N 3/04
USPC ....................................................... 715/747
See application file for complete search history.

(56) References Cited

U.S. PATENT DOCUMENTS

| 7,945,512 | B2 | 5/2011 | Scipioni et al. |
| 8,260,693 | B2 | 9/2012 | Griffin et al. |
| 8,640,021 | B2 | 1/2014 | Perez et al. |
| 9,230,367 | B2 | 1/2016 | Stroila |
| 9,286,637 | B1 | 3/2016 | Keld et al. |
| 9,477,940 | B2 | 10/2016 | Abernethy et al. |
| 2004/0260790 | A1* | 12/2004 | Balloni .................. A61B 5/055 709/219 |
| 2010/0030687 | A1 | 2/2010 | Panthaki et al. |
| 2010/0257457 | A1* | 10/2010 | De Goes ............. H04L 65/1093 715/751 |

(Continued)

*Primary Examiner* — Jason T Edwards
(74) *Attorney, Agent, or Firm* — Womble Bond Dickinson (US) LLP

(57) ABSTRACT

Methods, apparatuses, and computer program products are disclosed for dynamic user interfaces. An example computer-implemented method includes receiving a communication channel request from a first user and establishing a communication channel between a dynamic interface system and a device associated with the communication channel request. The computer-implemented method also includes determining that the first user and a second user are accessing the communication channel via the device and rendering a hybrid interface. The hybrid interface includes blended interface data based upon first user parameter data associated with the first user and second user parameter data associated with the second user, first personalized interface data based upon the first user parameter data, and second personalized interface data based upon the second user parameter data. The computer-implemented method may include obscuring the first personalized interface data and/or the second personalized interface data.

21 Claims, 6 Drawing Sheets

(56) References Cited

U.S. PATENT DOCUMENTS

| | | | |
|---|---|---|---|
| 2013/0151984 A1 | 6/2013 | Kimball et al. | |
| 2014/0039893 A1 | 2/2014 | Steven | |
| 2014/0041042 A1* | 2/2014 | Wong | G06F 21/6245 726/26 |
| 2014/0075328 A1* | 3/2014 | Hansen | G06Q 10/04 715/747 |
| 2014/0279004 A1 | 9/2014 | Thomas et al. | |
| 2015/0269393 A1* | 9/2015 | Lauder | G06F 21/6245 726/30 |
| 2016/0132721 A1* | 5/2016 | Bostick | G06F 21/6245 382/118 |
| 2017/0329399 A1* | 11/2017 | Azam | G06F 3/017 |
| 2018/0082068 A1* | 3/2018 | Lancioni | G06F 21/6245 |
| 2019/0057443 A1 | 2/2019 | Kanjlia et al. | |
| 2019/0109911 A1 | 4/2019 | Laliberte | |
| 2019/0251884 A1* | 8/2019 | Burns | G09G 1/007 |

\* cited by examiner

DYNAMIC USER INTERFACE SYSTEMS AND DEVICES

TECHNOLOGICAL FIELD

Example embodiments of the present disclosure relate generally to data visualization and, more particularly, to the generation of dynamic user interfaces.

BACKGROUND

Customers, consumers, and other users often interact with entities, such as financial institutions, via applications, portals, platforms, interfaces, and the like offered by these entities. These interfaces may display information regarding transactions between the entity and the users, account information of the users, and/or the like. In some instances, such as with jointly owned accounts, this information may be accessible by multiple users associated with the account.

BRIEF SUMMARY

As described above, businesses, financial institutions, venders, merchants, and other entities may offer their products, services, and other data for viewing by users often in the form of an application, portal, platform, and/or interface associated with the respective entity. Such interfaces traditionally provide information (e.g., costs, product listings, user account information, etc.) in a static format (e.g., unchanging) for viewing by a user associated with the interface. In some instances, however, a single account may be jointly owned or otherwise accessible by multiple parties. In such instances, the information provided by these traditional interfaces may similarly present information associated with each party for viewing in a static format such that each party is available to view all of the information presented by the interface. Additionally, in some instances, multiple parties may view information relating to a commonly owned account, joint application, or the like, on the same user device (e.g., a commonly viewed display). In this way, traditional application interfaces and associated data visualization systems fail to provide personalized data associated with each party for viewing on a common interface. Said differently, conventional interfaces may present account data or information that is only generic to multiple parties associated with the common account. These traditional systems further fail to properly present personalized account information to respective users in a format that maintains the privacy of such information.

To solve these issues and others, example implementations of embodiments of the present disclosure may receive an indication that a first and a second user are accessing a communication channel via a commonly viewed device and generate a hybrid interface for viewing by these distinct users. The described systems may generate blended interface data that is based upon first user parameter data associated with a first user and second user parameter data associated with a second user. Such blended interface data may represent information that is common to both the first user and the second user. The system may further generate first personalized interface data based upon the first user parameter data of the first user and second personalized interface data based upon the second user parameter data of the second user. In this way, the systems of the present disclosure may provide personalized user data to multiple users accessing a communication channel via a common device. Additionally, the systems described herein may operate to maintain the privacy of the personalized user data by, for example, obscuring the personalized user data from view by other users. In doing so, the system may, dynamically modify an interface viewable by multiple users on a commonly viewed display while maintaining the privacy of personalized data of the respective users. In this way, the inventors have identified that the advent of new display technologies have created a new opportunity for solutions for providing dynamic user interfaces which were historically unavailable. In doing so, such example implementations confront and solve at least two technical challenges: (1) they reduce memory burdens associated with the generation of multiple user interfaces, and (2) they dynamically adjust display characteristics to ensure user data privacy.

Systems, apparatuses, methods, and computer program products are disclosed herein for providing dynamic user interfaces. With reference to an example computer-implemented method, the method may include receiving a communication channel request from a user device and establishing a communication channel with the user device. The method may further include receiving an indication that a first user and a second user are accessing the communication channel via the user device and generating a hybrid interface. The hybrid interface may include blended interface data based upon first user parameter data associated with the first user and second user parameter data associated with the second user, first personalized interface data based upon the first user parameter data, and second personalized interface data based upon the second user parameter data.

In some embodiments, establishing the communication channel with the user device further includes generating an initial interface based upon one or more attributes associated with the communication channel request. In such an embodiment, generating the hybrid interface may include modifying the initial interface based on at least one of the blended interface data, the first personalized interface data, or the second personalized interface data.

In some embodiments, the method may further include causing the first personalized interface data to be obscured from view by the second user and causing the second personalized interface data to be obscured from view by the first user.

In some further embodiments, the method may include causing the first personalized interface data to be obscured further by causing presentation of the first personalized interface data on a first user device associated with the first user.

In some other further embodiments, the method may include causing the second personalized interface data to be obscured by causing presentation of the second personalized interface data on a second user device associated with the second user.

In some embodiments, the method may further include receiving an indication of the first user's attempt to view the second personalized interface data or of the second user's attempt to view the first personalized interface data. In response to the indication of the second user's attempt to view the first personalized interface data, the method may include causing the first personalized interface data to be obscured from view by the second user. In response to the indication of the first user's attempt to view the second personalized interface data, the method may include causing the second personalized interface data to be obscured from view by the first user.

In some embodiments, a computer-implemented method is provided that includes receiving a communication channel request from a first user and establishing a communication channel between a dynamic interface system and a device associated with the communication channel request. The method may further include determining that the first user and a second user are accessing the communication channel via the device and rendering a hybrid interface. The hybrid interface may include blended interface data based upon first user parameter data associated with the first user and second user parameter data associated with the second user, first personalized interface data based upon the first user parameter data, and second personalized interface data based upon the second user parameter data.

In some embodiments, establishing the communication channel further includes rendering an initial interface based upon the first user parameter data. In such an embodiment, the method may include rendering the hybrid interface by modifying the initial interface based on at least one of the blended interface data or the second personalized interface data.

In some embodiments, the method further includes obscuring view of the first personalized interface data by the second user and obscuring view of the second personalized interface data by the first user.

In some further embodiments, the method may include obscuring the first personalized interface data further by rendering at least a portion of the first personalized interface data on a first user device associated with the first user.

In some other further embodiments, the method may include obscuring the second personalized interface data by rendering at least a portion of the second personalized interface data on a second user device associated with the second user.

In some embodiments, the method may further include detecting the first user's attempt to view the second personalized interface data or of the second user's attempt to view the first personalized interface data. In response to the indication of the second user's attempt to view the first personalized interface data, the method may include obscuring view of the first personalized interface by the second user. In response to the indication of the first user's attempt to view the second personalized interface data, the method may include obscuring view of the second personalized interface data by the first user.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will be appreciated that the scope of the disclosure encompasses many potential embodiments in addition to those here summarized, some of which will be further described below.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Figure 1:
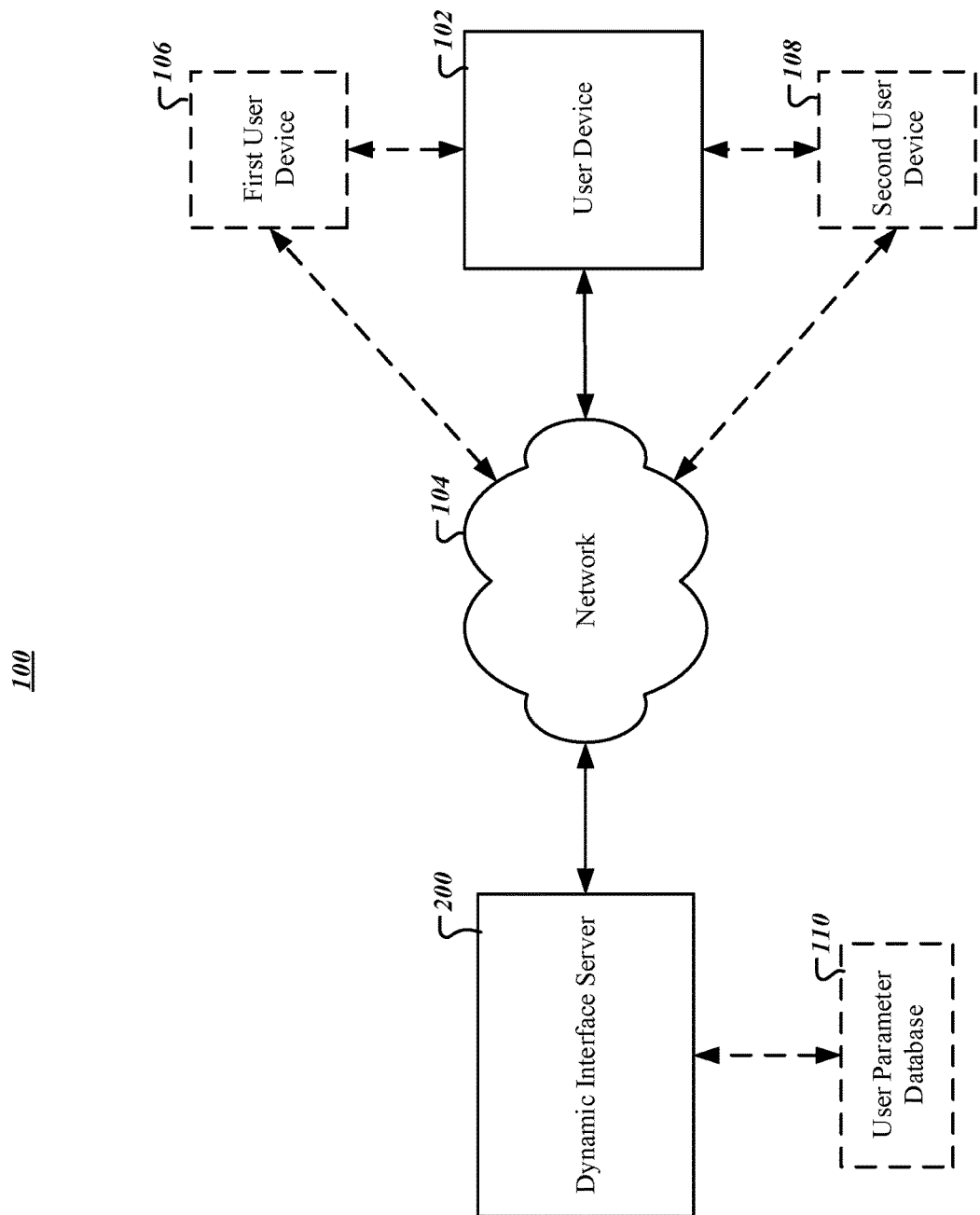
FIG. 1 illustrates a system diagram including devices that may be involved in some example embodiments described herein.

Some embodiments of the present disclosure will now be described more fully hereinafter with reference to the accompanying drawings, in which some, but not all embodiments are shown. Indeed, these embodiments may take many different forms and should not be construed as limited to the embodiments set forth herein; rather, these embodiments are provided so that this disclosure will satisfy applicable legal requirements. Like numbers refer to like elements throughout. As used herein, the description may refer to a dynamic interface server or user device as an example "apparatus." However, elements of the apparatus described herein may be equally applicable to the claimed method and computer program product. Thus, use of any such terms should not be taken to limit the spirit and scope of embodiments of the present invention.

Definition of Terms

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure. Further, where a first computing device is described herein to receive data from a second computing device, it will be appreciated that the data may be received directly from the second computing device or may be received indirectly via one or more intermediary computing devices, such as, for example, one or more servers, relays, routers, network access points, base stations, hosts, and/or the like, sometimes referred to herein as a "network." Similarly, where a first computing device is described herein as sending data to a second computing device, it will be appreciated that the data may be sent directly to the second computing device or may be sent indirectly via one or more intermediary computing devices, such as, for example, one or more servers, remote servers, cloud-based servers (e.g., cloud utilities), relays, routers, network access points, base stations, hosts, and/or the like.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

As used herein, the phrases "in one embodiment," "according to one embodiment," "in some embodiments,"

and the like generally refer to the fact that the particular feature, structure, or characteristic following the phrase may be included in at least one embodiment of the present disclosure. Thus, the particular feature, structure, or characteristic may be included in more than one embodiment of the present disclosure such that these phrases do not necessarily refer to the same embodiment.

As used herein, the word "example" is used to mean "serving as an example, instance, or illustration." Any implementation described herein as "example" is not necessarily to be construed as preferred or advantageous over other implementations.

As used herein, the terms "user device," "mobile device," "electronic device" and the like refer to computer hardware that is configured (either physically or by the execution of software) to access one or more services made available by an dynamic interface server (e.g., apparatus or computing device of the present disclosure) and, among various other functions, is configured to directly, or indirectly, transmit and receive data. Example user devices may include a smartphone, a tablet computer, a laptop computer, a wearable device (e.g., smart glasses, smart watch, or the like), and the like. In some embodiments, a user device may include a "smart device" that is equipped with a chip or other electronic device that is configured to communicate with the apparatus via Bluetooth, NFC, Wi-Fi, 3G, 4G, 5G, RFID protocols, and the like. By way of a particular example, a user device may be a mobile phone equipped with a Wi-Fi radio that is configured to communicate with a Wi-Fi access point that is in communication with the dynamic interface server 200 or other computing devices via a network.

As used herein, the term "first user device" refers to a user device as defined above that is associated with a first user profile and first user which may be in network communication with the dynamic interface server, user device, and/or the second user device. For example, a first user device may be smartphone or computing device of a user that may request, receive, and/or provide data to or from one of the devices described above.

As used herein, the terms "first user profile" may refer to a collection of settings, configurations, identifiers, data, and information associated with the first user and first user device. A first user profile configured in accordance with the present invention may be accessible by one or more of software applications that are supported by the dynamic interface server or computing device (e.g., associated with a financial institution, banking entity, or other $3^{rd}$ party) and, thus, may include application-specific preferences, settings, configurations, data, and information. In some example embodiments, a first user profile may include one or more financial parameters, transaction histories, balances, spending patterns, social media data entries, location data entries, preferences, or the like of the first user associated with the first user profile.

As used herein, the term "second user device" refers to a user device as defined above that is associated with a second user profile and second user which may be in network communication with the dynamic interface server, user device, and/or the first user device. For example, a second user device may be smartphone or computing device of a user that may request, receive, and/or provide data to or from one of the devices described above.

As used herein, the terms "second user profile" may refer to a collection of settings, configurations, identifiers, data, and information associated with the second user and second user device. A second user profile configured in accordance with the present invention may be accessible by one or more of software applications that are supported by the dynamic interface server or other computing device (e.g., associated with a financial institution, banking entity, or other $3^{rd}$ party) and, thus, may include application-specific preferences, settings, configurations, data, and information. In some example embodiments, a second user profile may include one or more financial parameters, transaction histories, balances, spending patterns, social media data entries, location data entries, preferences, or the like of the second user associated with the second user profile.

As used herein, the term "user parameter database" refers to a data structure or repository for storing user data, user parameters, user profile data and the like. Similarly, the "user parameters" of the user parameter database may refer to data generated by or relevant to a user device and associated user (e.g., account data, transaction data, purchase data, billing data, or the like). The user parameter database may be accessible by one or more software applications of the dynamic interface server 200.

As used herein, the term "communication channel" refers to hardware, software, and/or firmware components by which a user device communicates with a particular computing device, such as a server. Non-limiting examples of a communication channel include a particular secure session between a first computing device and a second computing device over a particular communication network and/or subset thereof (e.g., a communication session between a user's computing device and a server computing device over a Wi-Fi network maintained by the user, or a communication session between a user's computing device and a server computing device over a cellular network maintained by a third-party cellular service provider).

As used herein, the term "computer-readable medium" refers to non-transitory storage hardware, non-transitory storage device or non-transitory computer system memory that may be accessed by a controller, a microcontroller, a computational system or a module of a computational system to encode thereon computer-executable instructions or software programs. A non-transitory "computer-readable medium" may be accessed by a computational system or a module of a computational system to retrieve and/or execute the computer-executable instructions or software programs encoded on the medium. Exemplary non-transitory computer-readable media may include, but are not limited to, one or more types of hardware memory, non-transitory tangible media (for example, one or more magnetic storage disks, one or more optical disks, one or more USB flash drives), computer system memory or random access memory (such as, DRAM, SRAM, EDO RAM), and the like.

Having set forth a series of definitions called-upon throughout this application, an example system architecture and example apparatus is described below for implementing example embodiments and features of the present disclosure.

Example System

With reference to FIG. 1, an example system 100 is illustrated with an apparatus (e.g., a dynamic interface server 200) communicably connected via a network 104 to a user device 102 and, in some embodiments, a first user device 106 and/or a second user device 108. The example system 100 may also include a user parameter database 110 that may be hosted by the dynamic interface server 200, the user device 102, or otherwise hosted by devices in communication with the dynamic interface server 200. The system 100 may further include a user device 102 that may, in some embodiments, be communicably coupled with the dynamic interface server 200. In some instances, the user device 102 may include a plurality of interconnected user devices or user device components.

The dynamic interface server 200 may include circuitry, networked processors, or the like configured to perform some or all of the apparatus-based (e.g., dynamic interface server-based) processes described herein, and may be any suitable network server and/or other type of processing device. In this regard, dynamic interface server 200 may be embodied by any of a variety of devices. For example, the dynamic interface server 200 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. Example embodiments contemplated herein may have various form factors and designs but will nevertheless include at least the components illustrated in FIG. 2 and described in connection therewith. In some embodiments, the dynamic interface server 200 may be located remotely from the user device 102, or user parameter database 110, although in other embodiments, the dynamic interface server 200 may comprise, in whole or in part, the user device 102, the user parameter database 110, and/or the user parameter database 112. The dynamic interface server 200 may, in some embodiments, comprise several servers or computing devices performing interconnected and/or distributed functions. Despite the many arrangements contemplated herein, the dynamic interface server 200 is shown and described herein as a single computing device to avoid unnecessarily overcomplicating the disclosure.

The user device 102 may also include circuitry, networked processors, or the like configured to perform some or all of the apparatus-based processes described herein, and may include a suitable network server and/or other type of processing device (e.g., a controller or computing device of the user device 102). In this regard, user device 102 may be embodied by any of a variety of devices. For example, the user device 102 may be configured to receive/transmit data and may include any of a variety of fixed terminals, such as a server, desktop, or kiosk, or it may comprise any of a variety of mobile terminals, such as a portable digital assistant (PDA), mobile telephone, smartphone, laptop computer, tablet computer, or in some embodiments, a peripheral device that connects to one or more fixed or mobile terminals. The user device 102 may include various sensor system, accelerometers, gyroscopes, positional sensors, GPS sensors, cameras, image sensors, or the like configured to determine that a first user and a second user are accessing a communication channel via the user device 102. Example embodiments contemplated herein may have various form factors and designs but will nevertheless include at least the components illustrated in FIG. 3 and described in connection therewith.

The first user device 106 may refer to a user device associated with a first user as defined above and may be a cellular telephone (e.g., a smartphone and/or other type of mobile telephone), laptop, tablet, electronic reader, e-book device, media device, wearable, smart glasses, smartwatch, or any combination of the above. Similarly, the second user device 108 may refer to a user device associated with a second user as defined above and may also be a cellular telephone (e.g., a smartphone and/or other type of mobile telephone), laptop, tablet, electronic reader, e-book device, media device, wearable, smart glasses, smartwatch, or any combination of the above. Although only a first user device 106 and a second user device 108 are illustrated, the example system 100 may include any number of user devices associated with the same user or any number of respective other users.

The network 104 may include one or more wired and/or wireless communication networks including, for example, a wired or wireless local area network (LAN), personal area network (PAN), metropolitan area network (MAN), wide area network (WAN), or the like, as well as any hardware, software and/or firmware for implementing the one or more networks (e.g., network routers, switches, hubs, etc.). For example, the network 104 may include a cellular telephone, mobile broadband, long term evolution (LTE), GSM/EDGE, UMTS/HSPA, IEEE 802.11, IEEE 802.16, IEEE 802.20, Wi-Fi, dial-up, and/or WiMAX network. Furthermore, the network 104 may include a public network, such as the Internet, a private network, such as an intranet, or combinations thereof, and may utilize a variety of networking protocols now available or later developed including, but not limited to TCP/IP based networking protocols.

The user parameter database 110 may be stored by any suitable storage device configured to store some or all of the information described herein (e.g., memory 204 of the dynamic interface server 200 memory 304 of the use device 102, or a separate memory system separate from the dynamic interface server 200, such as one or more database systems, backend data servers, network databases, cloud storage devices, or the like provided by another device (e.g., online application or $3^{rd}$ party provider) or the user device 102). The user parameter database 110 may comprise data received from the dynamic interface server 200 (e.g., via a memory 204 and/or processor(s) 202) and/or the user device 102 and the corresponding storage device may thus store this data.

Example Server Apparatus of the Disclosure

Figure 2:
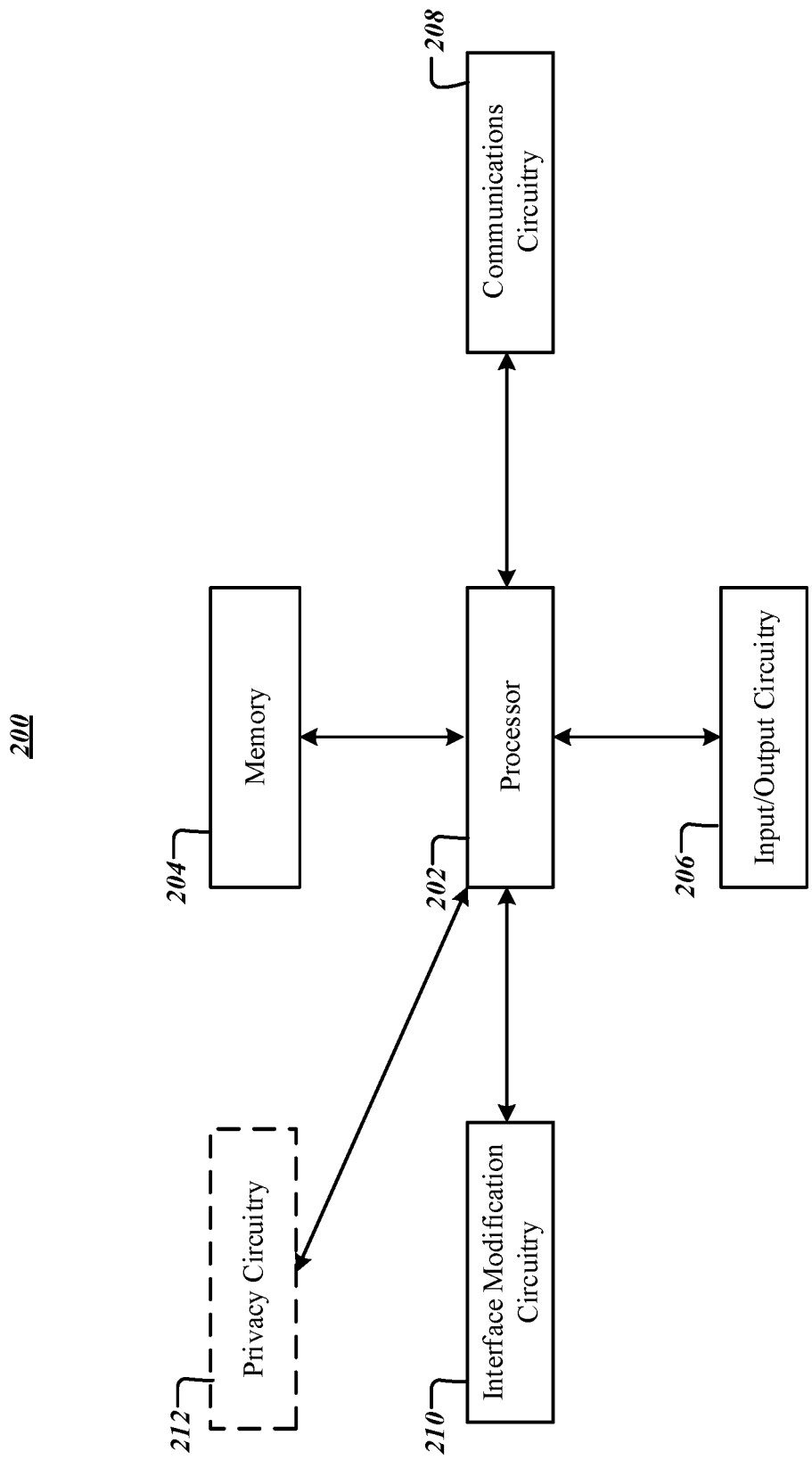
FIG. 2 illustrates a block diagram of an example apparatus embodying a dynamic interface server that may be specially configured in accordance with at least one example embodiment of the present disclosure.

As illustrated in FIG. 2, the dynamic interface server 200 may include a processor 202, a memory 204, communications circuitry 208, and input/output circuitry 206. Moreover, the dynamic interface server 200 may include interface modification circuitry 210 and privacy circuitry 212. The dynamic interface server 200 may be configured to execute the operations described below in connection with FIGS. 4-6. Although components 202-212 are described in some cases using functional language, it should be understood that the particular implementations necessarily include the use of particular hardware. It should also be understood that certain of these components 202-212 may include similar or common hardware. For example, two sets of circuitry may both leverage use of the same processor 202, memory 204, communications circuitry 208, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the dynamic interface server 200 may be housed within the user device 102 described hereafter. It will be understood in this regard that some of the components described in connection with the dynamic interface server 200 may be housed within this device, while other components are housed within another of these devices, or by yet another device not expressly illustrated in FIG. 1.

Of course, while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the dynamic interface server 200 may provide or supplement the functionality of particular circuitry.

In some embodiments, the processor 202 (and/or co-processor or any other processing circuitry assisting or otherwise associated with the processor) may be in communication with the memory 204 via a bus for passing information among components of the dynamic interface server 200. The memory 204 may be non-transitory and may include, for example, one or more volatile and/or non-volatile memories. In other words, for example, the memory may be an electronic storage device (e.g., a non-transitory computer readable storage medium). The memory 204 may be configured to store information, data, content, applications, instructions, or the like, for enabling the dynamic interface server 200 to carry out various functions in accordance with example embodiments of the present invention.

The processor 202 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the dynamic interface server, and/or remote or "cloud" processors.

In an example embodiment, the processor 202 may be configured to execute instructions stored in the memory 204 or otherwise accessible to the processor 202. Alternatively, or additionally, the processor 202 may be configured to execute hard-coded functionality. As such, whether configured by hardware or by a combination of hardware with software, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

The dynamic interface server 200 further includes input/output circuitry 206 that may, in turn, be in communication with processor 202 to provide output to a user and to receive input from a user, user device 102, or another source. In this regard, the input/output circuitry 206 may comprise a display that may be manipulated by a mobile application. In some embodiments, the input/output circuitry 206 may also include additional functionality such as a keyboard, a mouse, a joystick, a touch screen, touch areas, soft keys, a microphone, a speaker, or other input/output mechanisms. The processor 202 and/or user interface circuitry comprising the processor 202 may be configured to control one or more functions of a display through computer program instructions (e.g., software and/or firmware) stored on a memory accessible to the processor (e.g., memory 204 and/or the like).

The communications circuitry 208 may be any means such as a device or circuitry embodied in either hardware or a combination of hardware and software that is configured to receive and/or transmit data from/to a network and/or any other device, circuitry, or module in communication with the dynamic interface server 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the dynamic interface server 200 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The interface modification circuitry 210 includes hardware components designed to generate a hybrid interface based upon blended interface data, first personalized interface data, and/or second personalized interface data. The interface modification circuitry 210 may utilize processing circuitry, such as the processor 202, to perform its corresponding operations, and may utilize memory 204 to store collected information. In some instances, the interface modification circuitry 210 may generate an initial interface that is subsequently modified by the blended interface data, first personalized interface data, and/or second personalized interface data.

The privacy circuitry 212 includes hardware components designed to cause first personalized interface data to be obscured from view by the second user and/or cause the second personalized interface data to be obscured from view by the first user. The privacy circuitry 212 may utilize processing circuitry, such as the processor 202, to perform its corresponding operations, and may utilize memory 204 to store collected information. In some instances, the privacy circuitry 212 determine an attempt to view personalized interface data by either the first user or the second user.

It should also be appreciated that, in some embodiments, the interface modification circuitry 210 or privacy circuitry 212, may include a separate processor, specially configured field programmable gate array (FPGA), or application specific interface circuit (ASIC) to perform its corresponding functions.

In addition, computer program instructions and/or other type of code may be loaded onto a computer, processor or other programmable dynamic interface server's circuitry to produce a machine, such that the computer, processor other programmable circuitry that execute the code on the machine create the means for implementing the various functions, including those described in connection with the components of dynamic interface server 200.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example User Device of the Disclosure

Figure 3:
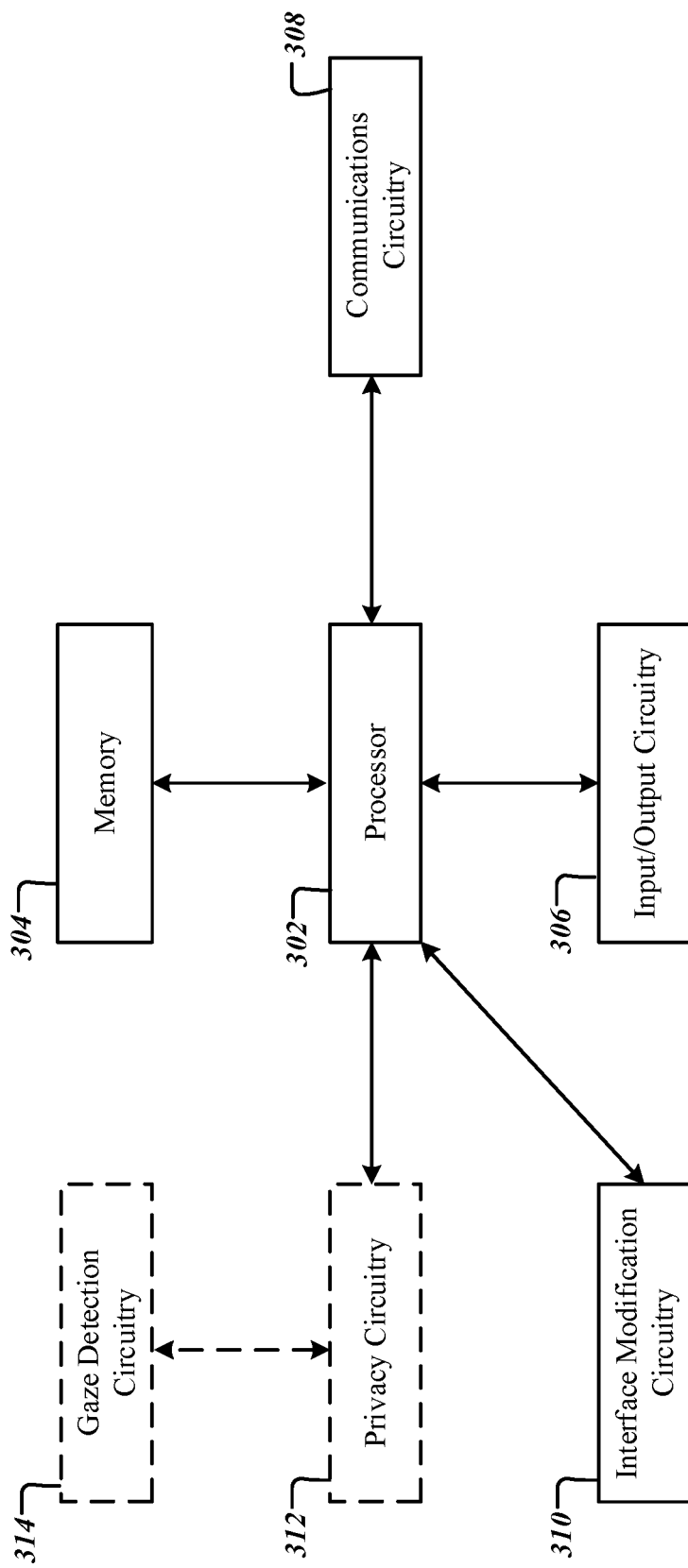
FIG. 3 illustrates a block diagram of an example user device that may be specially configured in accordance with at least one example embodiment of the present disclosure.

As described hereafter, in some embodiments, the claimed apparatus may refer to a user device 102. As such, the user device 102 may, in whole or in part, embody the functionality of the dynamic interface server 200. As illustrated in FIG. 3, the user device 102 may include a processor 302, a memory 304, communications circuitry 308, and input/output circuitry 306. Moreover, the user device 102 may include interface modification circuitry 310, privacy circuitry 312, and, in some embodiments, gaze detection circuitry 314. The user device 102 may be configured to execute the operations described below in connection with FIGS. 4-6. Although components 302-314 are described in some cases using functional language, it should be understood that the particular implementations necessarily include the use of particular hardware. It should also be understood that certain of these components 302-314 may include similar or common hardware. For example, two sets of circuitry may both leverage use of the same processor 302, memory 304, communications circuitry 308, or the like to perform their associated functions, such that duplicate hardware is not required for each set of circuitry. The use of the term "circuitry" as used herein includes particular hardware configured to perform the functions associated with respective circuitry described herein. As described in the example above, in some embodiments, various elements or components of the circuitry of the user device 102 may be housed within the dynamic interface server 200 described above. It will be understood in this regard that some of the components described in connection with the user device 102 may be housed within the dynamic interface server 200, while other components are housed within another of these devices, or by yet another device not expressly illustrated in FIG. 1.

As above, of course while the term "circuitry" should be understood broadly to include hardware, in some embodiments, the term "circuitry" may also include software for configuring the hardware. For example, although "circuitry" may include processing circuitry, storage media, network interfaces, input/output devices, and the like, other elements of the user device 102 may provide or supplement the functionality of particular circuitry.

In some embodiments, the processor 302 (and/or co-processor or any other processing circuitry assisting or otherwise associated with the processor) may be in communication with the memory 304 via a bus for passing information among components of the user device 102. The memory 304 may be non-transitory and may include, for example, one or more volatile and/or non-volatile memories. In other words, for example, the memory may be an electronic storage device (e.g., a non-transitory computer readable storage medium). The memory 304 may be configured to store information, data, content, applications, instructions, or the like, for enabling the user device 102 to carry out various functions in accordance with example embodiments of the present invention.

The processor 302 may be embodied in a number of different ways and may, for example, include one or more processing devices configured to perform independently. Additionally, or alternatively, the processor may include one or more processors configured in tandem via a bus to enable independent execution of instructions, pipelining, and/or multithreading. The use of the term "processing circuitry" may be understood to include a single core processor, a multi-core processor, multiple processors internal to the user device 102, and/or remote or "cloud" processors.

In an example embodiment, the processor 302 may be configured to execute instructions stored in the memory 304 or otherwise accessible to the processor 302. Alternatively, or additionally, the processor 302 may be configured to execute hard-coded functionality. As such, whether configured by hardware or by a combination of hardware with software, the processor 302 may represent an entity (e.g., physically embodied in circuitry) capable of performing operations according to an embodiment of the present invention while configured accordingly. Alternatively, as another example, when the processor 302 is embodied as an executor of software instructions, the instructions may specifically configure the processor 302 to perform the algorithms and/or operations described herein when the instructions are executed.

The user device 102 further includes input/output circuitry 306 that may, in turn, be in communication with processor 302 to provide output to a user and to receive input from a user, user device, or another source. In this regard, the input/output circuitry 306 may comprise a display that may be manipulated by a mobile application. As described hereafter, such a display may comprise a plurality of pixels that may be used to visualize data generated by the systems described herein. These pixels may, in some embodiments, be individually adjusted or controlled, for example by the processor 302. In particular, one or more parameters (e.g., brightness, polarization, contrast, aspect ratio, etc.) associated with each pixel may be modified as described hereinafter. In some embodiments, the input/output circuitry 306 may also include additional functionality such as a keyboard, a mouse, a joystick, a touch screen, touch areas, soft keys, a microphone, a speaker, or other input/output mechanisms. The processor 302 and/or user interface circuitry comprising the processor 302 may be configured to control one or more functions of a display through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the user device 102. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). These signals may be transmitted by the user device 102 using any of a number of wireless personal area network (PAN) technologies, such as Bluetooth® v1.0 through v3.0, Bluetooth Low Energy (BLE), infrared wireless (e.g., IrDA), ultra-wideband (UWB), induction wireless transmission, or the like. In addition, it should be understood that these signals may be transmitted using Wi-Fi, Near Field Communications (NFC), Worldwide Interoperability for Microwave Access (WiMAX) or other proximity-based communications protocols.

The interface modification circuitry 310 includes hardware components designed to render a hybrid interface based upon blended interface data, first personalized interface data, and/or second personalized interface data. The interface modification circuitry 310 may utilize processing circuitry, such as the processor 302, to perform its corresponding operations, and may utilize memory 304 to store collected information. In some instances, the interface modification circuitry 310 may render an initial interface that is subsequently modified by the blended interface data and/or second personalized interface data.

The privacy circuitry 312 includes hardware components designed to obscure first personalized interface data from view by the second user and/or obscure the second personalized interface data from view by the first user. The privacy circuitry 312 may utilize processing circuitry, such as the processor 302, to perform its corresponding operations, and may utilize memory 304 to store collected information. In some instances, the privacy circuitry 312 may determine an attempt to view personalized interface data by either the first user or the second user.

In some embodiments, the privacy circuitry 312 may further comprise gaze detection circuitry 314. The gaze detection circuitry 314 includes hardware components designed to capture one or more images of a user's eye during viewing of a display of the user device 102 and analyze said images. The gaze detection circuitry 314 may utilize processing circuitry, such as the processor 302, to perform its corresponding operations, and may utilize memory 304 to store collected information. By way of example, in some instances, a user may view a display of the user device 102 via his or her eyes (e.g., gazing at the display screen). The gaze detection circuitry 314 may capture and analyze one or more images of the user's eye(s) during this viewing in order to determine an attempt by the user to view personalized interface data associated with another user. In order to capture one or more images of a user's eye(s), the gaze detection circuitry 314 may comprises one or more cameras, imagers, image sensors, scanners, or the like.

It should also be appreciated that, in some embodiments, the interface modification circuitry 310, the privacy circuitry 312, and/or the gaze detection circuitry 314 may include a separate processor, specially configured field programmable gate array (FPGA), or application specific interface circuit (ASIC) to perform its corresponding functions.

In addition, computer program instructions and/or other type of code may be loaded onto a computer, processor or other programmable user device's circuitry to produce a machine, such that the computer, processor other programmable circuitry that execute the code on the machine create the means for implementing the various functions, including those described in connection with the components of user device 102.

As described above and as will be appreciated based on this disclosure, embodiments of the present invention may be configured as systems, methods, mobile devices, and the like. Accordingly, embodiments may comprise various means including entirely of hardware or any combination of software with hardware. Furthermore, embodiments may take the form of a computer program product comprising instructions stored on at least one non-transitory computer-readable storage medium (e.g., computer software stored on a hardware device). Any suitable computer-readable storage medium may be utilized including non-transitory hard disks, CD-ROMs, flash memory, optical storage devices, or magnetic storage devices.

Example Operations for Dynamic User Interfaces

Figure 4:
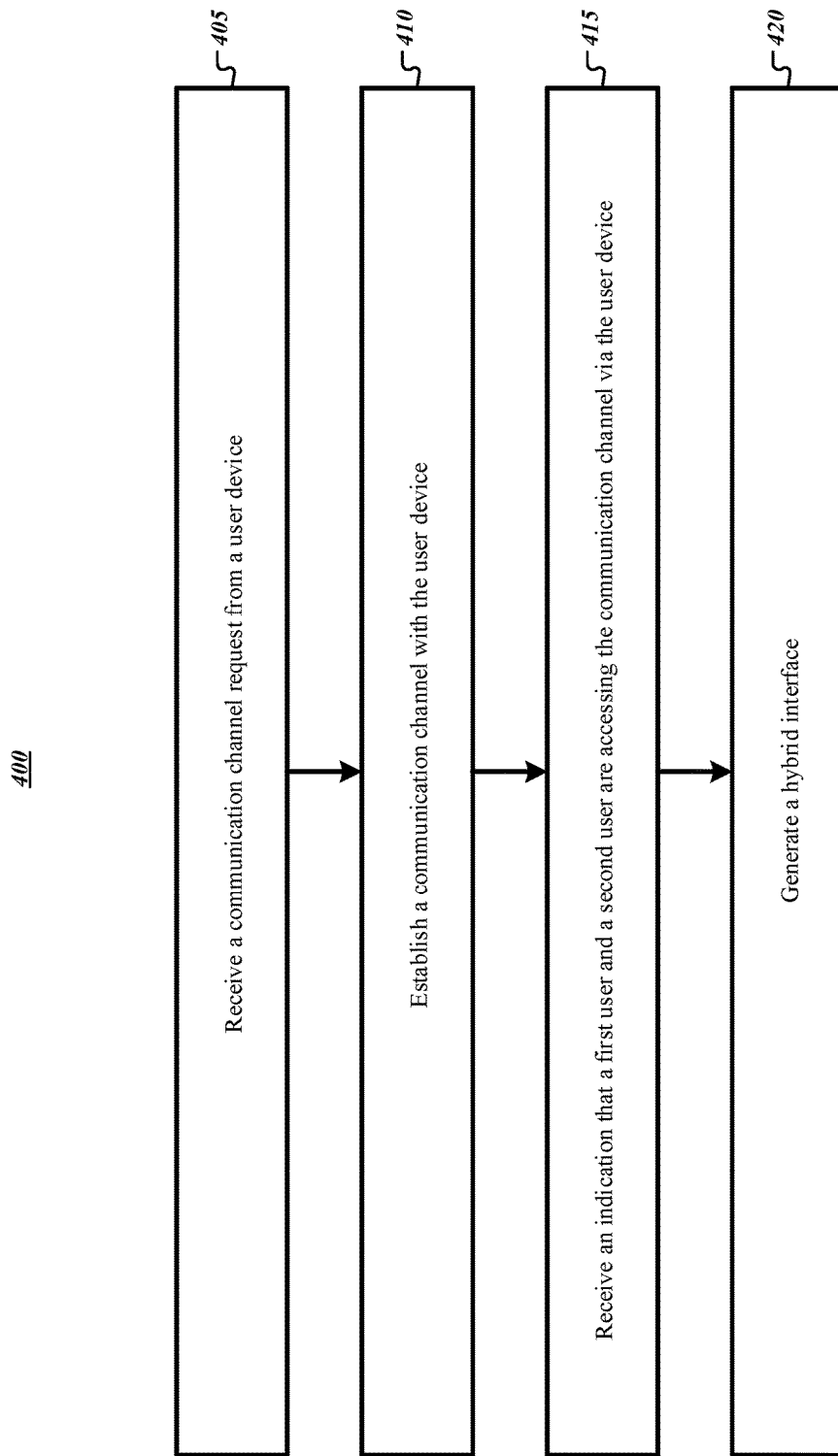
FIG. 4 illustrates an example flowchart for hybrid interface generation, in accordance with some example embodiments described herein.

FIG. 4 illustrates a flowchart containing a series of operations for hybrid interface generation. The operations illustrated in FIG. 4 may, for example, be performed by, with the assistance of, and/or under the control of an apparatus (e.g., dynamic interface server 200), as described above. In this regard, performance of the operations may invoke one or more of processor 202, memory 204, input/output circuitry 206, communications circuitry 208, interface modification circuitry 210, and/or privacy circuitry 212. The operations illustrated in FIG. 4 may, for example, be performed by, with the assistance of, and/or under the control of an apparatus (e.g., user device 102), as described above. In this regard, performance of the operations may invoke one or more of processor 302, memory 304, input/output circuitry 306, communications circuitry 308, interface modification circuitry 310, privacy circuitry 312, and/or gaze detection circuitry 314.

As shown in operation 405, the apparatus (e.g., dynamic interface server 200) includes means, such as input/output circuitry 206, communications circuitry 208, or the like, for receiving a communication channel request from a user device 102. In some example embodiments, a first user and/or second user may, via the user device 102, request access to an application, platform, interface, or the like associated with the dynamic interface server 200. By way of example, a first user may interact with the user device 102 that is in network communication with the dynamic interface server 200 and may input one or more account parameters, log-in credentials, or the like as part of requesting access to an application associated with the dynamic interface server 200. As such, this attempt to access, for example, an account associated with the first user may transmit a request for a communication channel between the user device 102 and the dynamic interface server 200 so as to provide this account access to the first user. As described hereafter with reference to FIG. 5, the communication channel request from the user device 102 may, in some embodiments, comprise first user parameter data associated with the request by the first user via the user device 102. Said differently, the communication channel request received at operation 405 may include account parameter data, financial transaction data, or the like (e.g., first user parameter data) associated with the first user.

In instances in which the user device 102 is the example apparatus, the user device 102 includes means, such as input/output circuitry 306, communications circuitry 308, processor 302, or the like, for receiving a communication channel request from a first user. As described above, the user device 102 may include one or more of a keyboard, a mouse, a joystick, a touch screen, touch areas, soft keys, a microphone, a speaker, or other input/output mechanisms configured to receive inputs from, for example, a first user. By way of example, a first user may interact with the user device 102 by inputting one or more account parameters, log-in credentials, or the like as part of requesting access to an application, account, interface, etc. associated with the dynamic interface server 200. As such, the user device 102 may, in response to receiving a communication channel request from a first user, transmit the communication channel request to the dynamic interface server 200.

Thereafter, as shown in operation 410, the apparatus (e.g., dynamic interface server 200) includes means, such as input/output circuitry 206, communications circuitry 208, or the like, for establishing a communication channel with the user device 102. As described above, the dynamic interface server 200 may receive, as part of the communication channel request at operation 405, one or more account parameters of a first user associated with the communication channel request (e.g., inputted at the user device 102). These account parameters of the first user (e.g., first user parameter data) may be verified and authenticated in order to establish a communication channel with the user device 102. By way of example, the dynamic interface server 200 may compare the account parameter data (e.g., account or log-in credentials) of the first user (e.g., first user parameter data) against known or otherwise valid account data associated with the first user. In response to determining that, for example, the received account parameter data matches the known or otherwise valid account data associated with the first user, the dynamic interface server 200 may establish a communication channel between the dynamic interface server 200 and the user device 102. Although described herein with reference to account parameter data, the present disclosure contemplates that any mechanism for channel or session authentication or establishment may be used based upon any data received by the server 200. For example, the dynamic interface server 200 may also receive biometric data or image data (e.g., captured by gaze detection circuitry 314 of the user device 102 or the like), authenticate the first user, and establish the communication channel with the user device 102 based upon this biometric data or image data.

In instances in which the user device 102 is the example apparatus, the user device 102 includes means, such as input/output circuitry 306, communications circuitry 308, or the like, for establishing a communication channel between a dynamic interface system (e.g., dynamic interface server 200) and a device (e.g., user device 102) associated with the communication channel request. As described above, the user device 102 may receive one or more account parameters inputted by the first user as part of the request received at operation 405. These account parameters of the first user (e.g., first user parameter data) may be verified and authenticated in order to establish a communication channel with the dynamic interface server 200 by the user device 102. Similar to the dynamic interface server 200, the user device 102 may compare the account parameter data (e.g., account or log-in credentials) of the first user (e.g., first user parameter data) against known or otherwise valid account data associated with the first user. In response to determining that, for example, the received account parameter data matches the known or otherwise valid account data associated with the first user, the dynamic interface server 200 may establish a communication channel between the dynamic interface server 200 and the user device 102. The present disclosure contemplates that user parameter day of any type may be used to verify the identity of the first user and/or authenticate a session or communication channel between the dynamic interface system (e.g., server 200) and the user device associated with the request (e.g., user device 102).

Thereafter, as shown in operation 415, the apparatus (e.g., dynamic interface server 200) includes means, such as processor 202, communications circuitry 208, or the like, for receiving an indication that a first user and a second user are accessing the communication channel via the user device 102. As described above, in some instances, more than one user may be associated with a commonly owned or otherwise accessible account, transaction, or the like. By way of example, the first user and a second user may each be joint account owners of a financial account or parties to a joint transaction (e.g., limited liability corporation (LLC) formation, mortgage transaction, etc.). As such, the dynamic interface server 200 may also receive, as part of the communication channel request at operation 405 or otherwise, account parameter data associated with the second user (e.g., second user parameter data). Similar to the first user parameter data, the account parameter data of the second user may include account information, log-in credentials, or the like associated with the second user's request to access the same application of the dynamic interface server 200 as the first user (e.g., a request to access the application on a common device). The dynamic interface server 200 may similarly authenticate the account parameters of the second user.

In other embodiments, however, the determination at operation 415 may refer to a determination based upon data provided by the user device 102 that is separate from the second user parameter data. By way of example, a camera, microphone, imager, or any other component of the user device 102 may detect the second user based upon, for example, images or sounds captured by the camera, microphone, imager, etc. of the user device 102. In particular, the user device 102 may, in some embodiments, comprise a computing device, laptop computer, or the like that also includes a camera configured to capture images in a field of view of the camera. In establishing and maintaining a communication channel as described above, the dynamic interface server 200 may analyze, via image processing techniques or the like, the images captured by the camera and detect the presence of a user other than the first user (e.g., a second user).

In instances in which the user device 102 is the example apparatus, the user device 102 includes means, such as input/output circuitry 306, communications circuitry 308, or the like, for determining that the first user and a second user are accessing the communication channel via the user device 102. As described above, the user device 102 may include one or more of a keyboard, a mouse, a joystick, a touch screen, touch areas, soft keys, a microphone, a speaker, or other input/output mechanisms configured to receive inputs from, for example, a second user. By way of example, a second user may interact with the user device 102 by inputting one or more account parameters, log-in credentials, or the like as part of requesting access to the application, account, interface, etc. associated with the dynamic interface server 200. As such, the user device 102 may receive account parameters associated with the second user and similarly authenticate the account parameters of the second user. In an instance in which the user device 102 receive account parameters associated with the second user, the user device 102 may determine that the first user and a second user are accessing the communication channel via the user device 102.

In other embodiments, however, the determination at operation 415 may refer to a determination based upon data captured by the user device 102 that is separate from the second user parameter data. As described above, a camera, microphone, imager, or any other component of the user device 102 may detect the second user based upon, for example, images or sounds captured by the camera, microphone, imager, etc. of the user device 102. For example, the user device 102 may, in some embodiments, comprise a camera configured to capture images in a field of view of the camera and may, via image processing techniques, detect the presence of a user other than the first user (e.g., a second user) based upon the captured images.

Thereafter, as shown in operation 420, the apparatus (e.g., dynamic interface server 200) includes means, such as processor 202, interface modification circuitry 210, or the like, for generating a hybrid interface. As described above, the dynamic interface server 200 may receive first user parameter data associated with a first user as part of a communication channel request. In some embodiments, such as instances in which the dynamic interface server 200 is formed as part of or associated with a financial institution, the dynamic interface server 200 may further have access to a plurality of first parameter data associated with the first user. By way of example, the dynamic interface server 200 may query memory 204 or the user parameter database 110 to retrieve first user parameter data associated with the first user. As defined above, the first user parameter data may include account data, location data, account preferences, social media data, financial transaction data, and/or the like. The interface modification circuitry 210 may generate first personalized interface data based upon the first user parameter data for populating a blended portion of the hybrid interface as well as a personalized portion of the hybrid interface.

By way of example, the first user parameter data may comprise various data entries indicative of the preferences of the first user with regard to placement of information in an interface, the type of information presented in an interface, and/or the like. As such, at operation 420, the interface modification circuitry 210 may generate first personalized interface data based upon the first user parameter data that includes these preferences. The first personalized interface data may subsequently be used to populate a first portion of the hybrid interface that comprises only first personalized interface data. Said differently, the interface modification circuitry 210 may operate to provide a portion of the hybrid interface that is personalized for the first user.

Similarly, the dynamic interface server 200 may receive second user parameter data associated with a second user as part of a communication channel request. In some embodiments, such as instances in which the dynamic interface server 200 is formed as part of or associated with a financial institution, the dynamic interface server 200 may further have access to a plurality of second parameter data associated with the second user. By way of example, the dynamic interface server 200 may query memory 204 or the user parameter database 110 to retrieve second user parameter data associated with the second user. As defined above, the second user parameter data may include account data, location data, account preferences, social media data, financial transaction data, and/or the like of the second user. The interface modification circuitry 210 may generate second personalized interface data based upon the second user parameter data for populating a blended portion of the hybrid interface as well as a second personalized portion of the hybrid interface.

By way of example, the second user parameter data may comprise various data entries indicative of the preferences of the second user with regard to placement of information in an interface, the type of information presented in an interface, and/or the like. As such, at operation 420, the interface modification circuitry 210 may generate second personalized interface data based upon the second user parameter data that includes these preferences. The second personalized interface data may subsequently be used to populate a second portion of the hybrid interface that comprises only second personalized interface data. Said differently, the interface modification circuitry 210 may operate to provide a portion of the hybrid interface that is personalized for the second user.

With continued reference to operation 420, the dynamic interface server 200 may further generate blended interface data based upon the first user parameter data and the second user parameter data described herein. By way of example, the interface modification circuitry 210 may analyze or otherwise compare the first user parameter data and the second user parameter data to identify common or similar data entries. These common data entries may relate to the placement of information in an interface, the type of information present in an interface, and/or the like. For example, in instances in which the first user and the second user are joint account holders, the interface modification circuitry 210 may compare first user parameter data and second user parameter data and identify particular account data entries (e.g., current balance, interest rate, etc.) associated with the joint account. The interface modification circuitry 210 may generated blended interface data that comprises these common or similar data entries.

In generating the hybrid interface, the interface modification circuitry 210 may transmit an instruction to the user device 102 to render the blended interface data for viewing by both the first user and the second user. The interface modification circuitry 210, however, may transmit generated first personalized interface data to the user device 102 for rending such that, for example, the first personalized interface data is viewable by the first user. In some instances, the first personalized interface data may be positioned in the hybrid interface based upon the physical location of the first user (e.g., located proximate the first user for ease of viewing). In other instances, the first personalized interface data may be positioned in the hybrid interface such that the first personalized interface data may not be viewed by the second user as described hereafter with reference to FIGS. 5-6. The interface modification circuitry 210 may also transmit generated second personalized interface data to the user device 102 for rending such that, for example, the second personalized interface data is viewable by the second user. In some instances, the second personalized interface data may be positioned in the hybrid interface based upon the physical location of the second user (e.g., located proximate the second user for ease of viewing). In other instances, the second personalized interface data may be positioned in the hybrid interface such that the second personalized interface data may not be viewed by the first user as described hereafter with reference to FIGS. 5-6.

By way of example, the interface modification circuitry 210 may transmit instructions to the user device 102 to render a hybrid interface that includes account balance information, interest rate information, or any data that is common or similar between the first user parameter data and the second user parameter data. The blended interface data may be rendered by the user device 102 in the hybrid interface such that this information is viewable by the first user and the second user. During operation, the blended interface data may, for example, be iteratively updated based upon changes to the first user parameter data and the second user parameter data. For example, the first user and the second user may contact a financial advisor as part of the joint account with a financial institution. During discussions with the financial advisor, as captured by, for example, a camera of the user device 102, the first user parameter data and the second user parameter data may change. For example, a financial transaction associated with the account may occur (e.g. a recurring payment or the like) such that the blended interface data is updated to account for such a transaction.

Similarly, during operation, one of the first user parameter data or the second user parameter data may change independent of the other of the first user parameter data or the second user parameter data. For example, during discussions with a financial advisor, the first user may transmit a question to the financial advisor (e.g., via the first user device 106) regarding first user parameter data that is distinct from the second user parameter data (e.g., how will this affect my other accounts?). Such a questions may not be common with or similar to the second user parameter data such that the first personalized interface data may be updated to account for this question. Said differently, the portion of the hybrid interface that is viewable by the first user may be updated to provide information in response to the question by the first user. Although described herein with reference to a question by the first user, the present disclosure contemplates that the personalized interface data of the first user or the second user may be dynamically modified based upon a plurality of factors associated with the respective user. For example, the first personalized interface data may provide financial information associated with the first user for viewing by only the first user while the second personalized interface data provides financial information associated with the second user for viewing by only the second user. In this way, the hybrid interface may present data that is not only common to multiple users (e.g., the first user and the second user) but also personalized data for the respective users that is only viewable by the respective users as described hereafter.

In instances in which the user device 102 is the example apparatus, the user device 102 includes means, such as input/output circuitry 306, communications circuitry 308, interface modification circuitry 310, or the like, for rendering a hybrid interface. Similar to the description provided herein regarding operations of the dynamic interface server, the user device 102 may generate first personalized interface data based upon the first user parameter data that includes preferences of the first user for populating the blended portion of the hybrid interface as well as a first personalized portion of the hybrid interface. Similarly, the interface modification circuitry 310 may generate second personalized interface data based upon the second user parameter data for populating a blended portion of the hybrid interface as well as a second personalized portion of the hybrid interface. The blended interface data may be generated by the interface modification circuitry 310 based upon the first user parameter data and the second user parameter data as described above.

Figure 5:
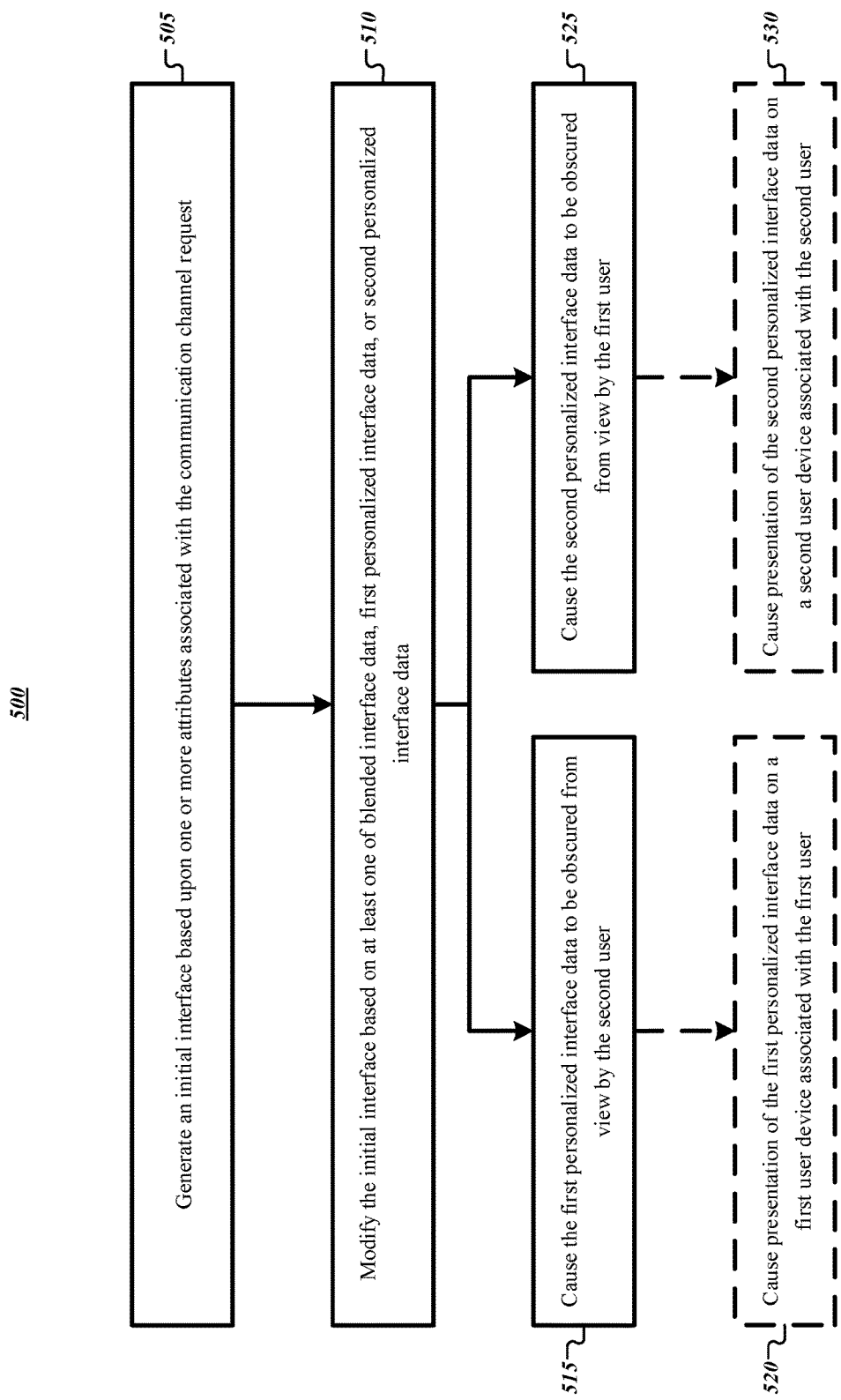
FIG. 5 illustrates an example flowchart for the obscuring of personalized interface data, in accordance with some example embodiments described herein.

Turning next to FIG. 5, a flowchart is shown for the obscuring of personalized interface data. The operations illustrated in FIG. 5 may, for example, be performed by, with the assistance of, and/or under the control of an apparatus (e.g., dynamic interface server 200), as described above. In this regard, performance of the operations may invoke one or more of processor 202, memory 204, input/output circuitry 206, communications circuitry 208, interface modification circuitry 210, and/or privacy circuitry 212. The operations illustrated in FIG. 5 may, for example, be performed by, with the assistance of, and/or under the control of an apparatus (e.g., user device 102), as described above. In this regard, performance of the operations may invoke one or more of processor 302, memory 304, input/output circuitry 306, communications circuitry 308, interface modification circuitry 310, privacy circuitry 312, and/or gaze detection circuitry 314.

As shown in operation 505, the apparatus (e.g., dynamic interface server 200) includes means, such as input/output circuitry 206, interface modification circuitry 210, privacy circuitry 212, or the like, for generating an initial interface based upon one or more attributes associated with the communication channel request. As described above, a first user and/or second user, via the user device 102, may request access to an application, platform, interface, or the like associated with the dynamic interface server 200. For example, a first user may interact with the user device 102 that is in network communication with the dynamic interface server 200 and may input one or more account parameters, log-in credentials, or the like as part of requesting access to an application associated with the dynamic interface server 200. As such, this attempt to access, for example, an account associated with the first user may transmit a request for a communication channel between the user device 102 and the dynamic interface server 200 so as to provide this account access to the first user. This communication channel request from the user device 102 may comprise first user parameter data associated with the request by the first user via the user device 102. Said differently, the communication channel request received at operation 405 may include account parameter data, financial transaction data, or the like (e.g., first user parameter data) associated with the first user. As such, the interface modification circuitry may generate an initial interface based upon the attributes associated with the communication channel request (e.g., the first user parameters). For example, the initial interface may display various parameters associated with the first user, first user account, preferences of the first user, and/or the like.

In instances in which the user device 102 is the example apparatus, the user device 102 includes means, such as input/output circuitry 306, processor 302, interface modification circuitry 310, or the like, for similarly rendering an initial interface based upon the first user parameter data. As described above, a first user may interact the user device 102 and may input one or more account parameters, log-in credentials, or the like as part of requesting access to an application associated with the dynamic interface server 200. As such, this attempt to access, for example, an account associated with the first user may provide first user parameter data for generating an initial interface based upon the attributes associated with the communication channel request (e.g., the first user parameters). For example, the user device 102 may render an initial interface that displays various parameters associated with the first user, first user account, preferences of the first user, and/or the like.

As shown in operation 510, the apparatus (e.g., dynamic interface server 200) includes means, such as input/output circuitry 206, interface modification circuitry 210, or the like, for modifying the initial interface based on at least one of blended interface data, first personalized interface data, or second personalized interface data. As described above, the dynamic interface server 200 may detect the presence of a second user accessing the communication channel via the user device 102 (e.g., a commonly viewed device with the first user). As such, the interface modification circuitry 210 may, at operation 510, modify the initial interface to account for the detected second user. By way of example, the interface modification circuitry 210 may generate second personalized interface data based upon second user parameter data as described above. As such, the modification at operation 510 may refer to the generation of a hybrid interface that modifies the initial interface by including blended interface data and/or second personalized interface data.

By way of a more particular example, the modification at operation 510 may refer to use of the initial interface (e.g., populated by the first user parameter data) as the first personalized interface data for viewing by the first user. The hybrid interface may use the blended interface data and the second personalized interface data to modify the initial interface by including the blended interface data as part of the initial interface for viewing by the first user and the second user and including the second personalized interface data for viewing by the second user. In instances in which the user device 102 is the example apparatus, the user device 102 includes means, such as input/output circuitry 306, processor 302, interface modification circuitry 310, or the like, for modifying the initial interface based on at least one of the blended interface data or the second personalized interface data as described above.

As shown in operation 515, the apparatus (e.g., dynamic interface server 200) includes means, such as input/output circuitry 206, privacy circuitry 212, or the like, for causing the first personalized interface data to be obscured from view by the second user. As described above, the user device 102 may comprise a display formed of a plurality of pixels that may be used to visualize data (e.g., the hybrid interface). These pixels may, in some embodiments, be individually adjusted or controlled. By way of example, in some embodiments, the pixels that comprise the display of the user device 102 may be configured such that one or more of the brightness, polarization, contrast, or other feature may be independently adjusted. By way of a more particular example, the polarization of one or more pixels of the display may be adjusted such that that pixels operate as an optical filter that blocks light from certain angles. Said differently, the polarization of one or more pixels may be adjusted such that the pixels may only be viewed from a defined positioned relative to the pixels. In other embodiments, the brightness, aspect ratio, contrast, etc. may be adjusted such that the ability to view the adjusted pixels is reduced as the distance from the respective pixels and the viewer increase. Said differently, the brightness associated with particular pixels may be lowered such that the pixels are only viewed by a user in close proximity to the pixels. Although described herein with reference to polarization and brightness, the present disclosure contemplates that any other mechanism for obscuring data (e.g., blurring, blacking out, powering off, etc.) may be used.

With continued reference to operation 515, the dynamic interface server 200 may transmit an instruction to the user device 102 to obscure the first personalized interface data from view by the second user. For example, the user device 102 may adjust the polarization, brightness, aspect ratio, contrast, etc. associated with the pixels that display the first personalized interface data in a manner that prevents the second user from viewing the first personalized interface data. Given that the relative position between the users (e.g., first user and second user) may change during operation, the dynamic interface server 200 may be configured to identify a change in the position of the second user, via a camera and image processing techniques, and dynamically adjust the polarization, brightness, aspect ratio, contrast, etc. of the pixels displaying the first personalized interface data in order to ensure that the first personalized interface data remains obscured to the second user. In instances in which the user device 102 is the example apparatus, the user device 102 includes means, such as input/output circuitry 306, processor 302, interface modification circuitry 310, or the like, for obscuring the first personalized interface data from view by the second user as described above.

In some embodiments, as shown in operation 520, the apparatus (e.g., dynamic interface server 200) includes means, such as input/output circuitry 206, privacy circuitry 212, or the like, for causing presentation of the first personalized interface data on a first user device 106 associated with the first user. In some instances, the relative positioning between the first user and the second user may be such that the respective personalized interface data may not be sufficient obscured on a common display (e.g., on the user device 102). In some instances, the respective personalized interface data may be of a sufficiently private nature such that the risk of viewing by another user exceeds the benefits provided by user of a common interface (e.g., as determined by various account preferences, thresholds, etc.). In either instance, the privacy circuitry 212 may be configured to cause the first personalized interface data to be presented on a first user device 106 associated with the first user. Said differently, the dynamic interface server 200 may transmit the first personalized interface data, in whole or in part, for viewing on a, for example, mobile phone of the first user. In instances in which the user device 102 is the example apparatus, the user device 102 includes means, such as input/output circuitry 306, processor 302, privacy circuitry 312, or the like, for rendering at least a portion of the first personalized interface data on a first user device 106 associated with the first user.

As shown in operation 525, the apparatus (e.g., dynamic interface server 200) includes means, such as input/output circuitry 206, privacy circuitry 212, or the like, for causing the second personalized interface data to be obscured from view by the first user. Similar to operation 515, the user device 102 may adjust the polarization, brightness, aspect ratio, contrast, etc. associated with the pixels that display the second personalized interface data in a manner that prevents the first user from viewing the second personalized interface data. Given that the relative position between the users (e.g., first user and second user) may change during operation, the dynamic interface server 200 may be configured to identify a change in the position of the first user, via a camera and image processing techniques, and dynamically adjust the polarization, brightness, aspect ratio, contrast, etc. of the pixels displaying the second personalized interface data in order to ensure that the second personalized interface data remains obscured to the first user. In instances in which the user device 102 is the example apparatus, the user device 102 includes means, such as input/output circuitry 306, processor 302, interface modification circuitry 310, privacy circuitry 312, or the like, for obscuring the second personalized interface data from view by the first user as described above.

In some embodiments, as shown in operation 530, the apparatus (e.g., dynamic interface server 200) includes means, such as input/output circuitry 206, privacy circuitry 212, or the like, for causing presentation of the second personalized interface data on a second user device 108 associated with the second user. In some instances, the relative positioning between the first user and the second user may be such that the respective personalized interface data may not be sufficient obscured on a common display (e.g., on the user device 102). In some instances, the respective personalized interface data may be of a sufficiently private nature such that the risk of viewing by another user exceeds the benefits provided by user of a common interface (e.g., as determined by various account preferences, thresholds, etc.). In either instance, the privacy circuitry 212 may be configured to cause the second personalized interface data to be presented on a second user device 108 associated with the second user. Said differently, the dynamic interface server 200 may transmit the second personalized interface data, in whole or in part, for viewing on a, for example, mobile phone of the second user. In instances in which the user device 102 is the example apparatus, the user device 102 includes means, such as input/output circuitry 306, processor 302, privacy circuitry 312, or the like, for rendering at least a portion of the second personalized interface data on a second user device 108 associated with the second user.

Figure 6:
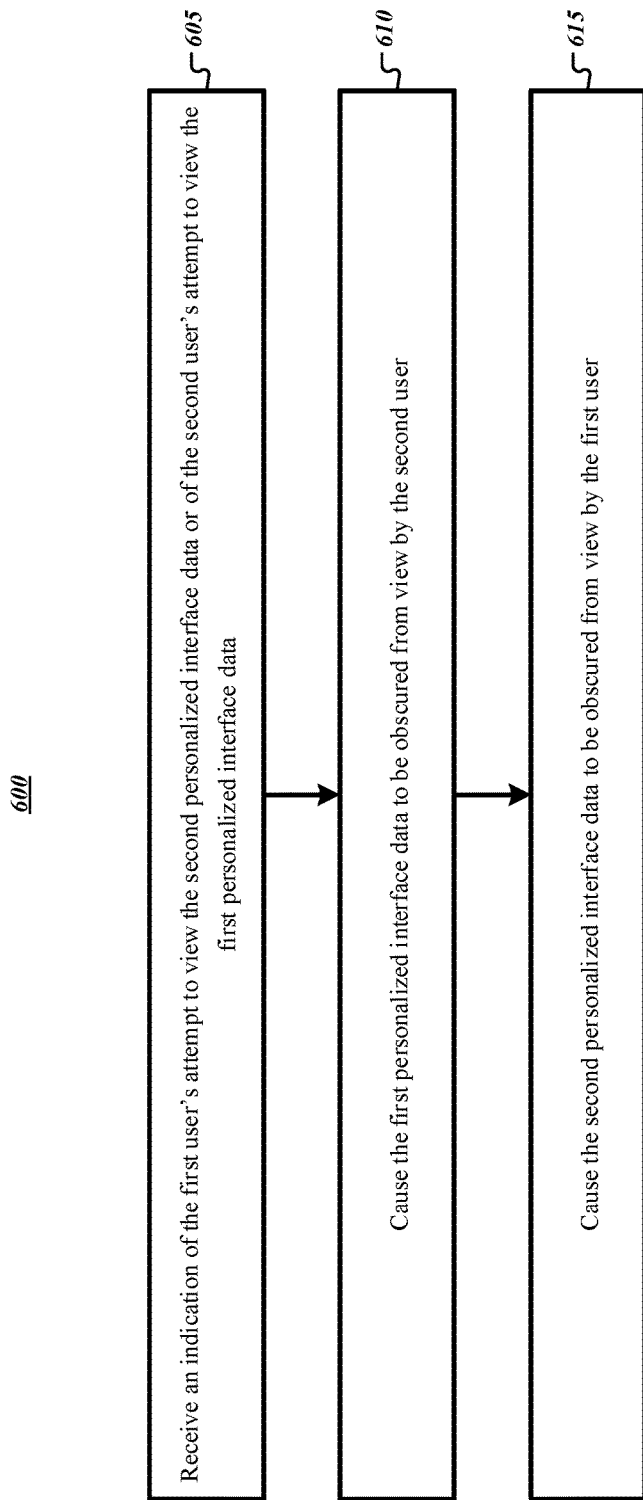
FIG. 6 illustrates an example flowchart for view attempt determinations, in accordance with some example embodiments described herein.

Turning next to FIG. 6, a flowchart is shown for view attempt determinations. The operations illustrated in FIG. 6 may, for example, be performed by, with the assistance of, and/or under the control of an apparatus (e.g., dynamic interface server 200), as described above. In this regard, performance of the operations may invoke one or more of processor 202, memory 204, input/output circuitry 206, communications circuitry 208, interface modification circuitry 210, and/or privacy circuitry 212. The operations illustrated in FIG. 6 may, for example, be performed by, with the assistance of, and/or under the control of an apparatus (e.g., user device 102), as described above. In this regard, performance of the operations may invoke one or more of processor 302, memory 304, input/output circuitry 306, communications circuitry 308, interface modification circuitry 310, privacy circuitry 312, and/or gaze detection circuitry 314.

As shown in operation 605, the apparatus (e.g., dynamic interface server 200) includes means, such as input/output circuitry 206, communications circuitry 208, privacy circuitry 212, or the like, for receiving an indication of the first user's attempt to view the second personalized interface data or of the second user's attempt to view the first personalized interface data. As described above, the user device 102 may include a camera, microphone, scanner, imager, or other feature configured to capture images of the first user and the second user during viewing of a common display of the user device 102. The privacy circuitry 212 of the server 200 may receive one or more images of the first user's eye(s) and the second user's eye(s) via a camera (e.g., or equivalent device) of the user device 102. In order to determine a gaze direction associated with each of the first user and the second user, the privacy circuitry 212 may identify a user's face, eye, pupil, and/or other related features captured in the one or more images of the first user's eye and the second user's eye. In some embodiments, the privacy circuitry 212 may further identify a vector between the center of each user's pupil and a reflection (e.g., corneal reflections) on each user's eye as a result of the displayed hybrid interface. This vector may be indicative of the user's gaze direction for each respective user.

Although described herein with reference to vector techniques and corneal reflections, the present disclosure contemplates that any eye tracking or gaze detection technique (e.g., active light, dark pupil, bright pupil, passive light, and/or the like) may be used to determine the gaze direction of the first user's eye and the second user's eye. This gaze direction for the first user and the second user may be used to determine an instance in which the first user attempts to view the second personalized interface data or of the second user attempts to view the first personalized interface data. Said differently, the gaze direction for the first user may be compared with the location of the pixels displaying the second personalized interface data, and the gaze direction for the second user may be compared with the location of the pixels displaying the first personalized interface data. In an instance in which either gaze direction aligns with at least one pixel displaying the opposite user's personalized interface data, the server 200 may determine an indication of the respective user's attempt. In some embodiments, the indication at operation 605 may refer to movement of the physical display of the user device 102. Said differently, the gaze detection circuitry 314 of the user device may detect movement of the display such that either the first user or the second user is not longer in a field of view of the display and may obscure or un-obscure personalized interface data accordingly.

As shown in operation 610, the apparatus (e.g., dynamic interface server 200) includes means, such as input/output circuitry 206, interface modification circuitry 210, or the like, for causing the first personalized interface data to be obscured from view by the second user in response to the indication of the second user's attempt to view the first personalized interface data. As described above with reference to operation 515, the dynamic interface server 200 may cause the user device 102 to adjust the polarization, brightness, aspect ratio, contrast, etc. associated with the pixels that display the first personalized interface data in a manner that prevents the second user from viewing the first personalized interface data. Given that the relative position between the users (e.g., first user and second user) may change during operation, the dynamic interface server 200 may be configured to identify a change in the position of the second user, via a camera and image processing techniques, and dynamically adjust the polarization, brightness, aspect ratio, contrast, etc. of the pixels displaying the first personalized interface data in order to ensure that the first personalized interface data remains obscured to the second user. In instances in which the user device 102 is the example apparatus, the user device 102 includes means, such as input/output circuitry 306, processor 302, interface modification circuitry 310, privacy circuitry 312, or the like, for obscuring the first personalized interface data from view by the second user as described above.

As shown in operation 615, the apparatus (e.g., dynamic interface server 200) includes means, such as the processor 202, the interface modification circuitry 210, or the like, for causing the second personalized interface data to be obscured from view by the first user in response to the indication of the first user's attempt to view the second personalized interface data. As described above with reference to operation 525, the dynamic interface server 200 may cause the user device 102 to adjust the polarization, brightness, aspect ratio, contrast, etc. associated with the pixels that display the second personalized interface data in a manner that prevents the first user from viewing the second personalized interface data. Given that the relative position between the users (e.g., first user and second user) may change during operation, the dynamic interface server 200 may be configured to identify a change in the position of the first user, via a camera and image processing techniques, and dynamically adjust the polarization, brightness, aspect ratio, contrast, etc. of the pixels displaying the second personalized interface data in order to ensure that the second personalized interface data remains obscured to the first user. In instances in which the user device 102 is the example apparatus, the user device 102 includes means, such as input/output circuitry 306, processor 302, interface modification circuitry 310, privacy circuitry 312, or the like, for obscuring the second personalized interface data from view by the first user as described above.

As described above, various technical challenges are surmounted via technical solutions contemplated herein. For instance, example implementations of embodiments of the present disclosure may receive an indication that a first and a second user are accessing a communication channel via a commonly viewed device and generate a hybrid interface for viewing by these distinct users. The described systems may generate blended interface data that is based upon first user parameter data associated with a first user and second user parameter data associated with a second user. Such blended interface data may represent information that is common to both the first user and the second user. The system may further generate first personalized interface data based upon the first user parameter data of the first user and second personalized interface data based upon the second user parameter data of the second user. In this way, the systems of the present disclosure may provide personalized user data to multiple users accessing a communication channel via a common device. Additionally, the systems described herein may operate to maintain the privacy of the personalized user data by, for example, obscuring the personalized user data from view by other users. In doing so, the system may, dynamically modify an interface viewable by multiple users on a commonly viewed display while maintaining the privacy of personalized data of the respective users. In this way, the inventors have identified that the advent of new display technologies have created a new opportunity for solutions for providing dynamic user interfaces which were historically unavailable. In doing so, such example implementations confront and solve at least two technical challenges: (1) they reduce memory burdens associated with the generation of multiple user interfaces, and (2) they dynamically adjust display characteristics to ensure user data privacy.

FIGS. 4-6 thus illustrate flowcharts describing the operation of apparatuses, methods, and computer program products according to example embodiments contemplated herein. It will be understood that each flowchart block, and combinations of flowchart blocks, may be implemented by various means, such as hardware, firmware, processor, circuitry, and/or other devices associated with execution of software including one or more computer program instructions. For example, one or more of the operations described above may be implemented by an apparatus executing computer program instructions. In this regard, the computer program instructions may be stored by a memory 204 of the dynamic interface server 200 and executed by a processor 202 of the dynamic interface server 200. Additionally, the computer program instructions may be stored by a memory 304 of the user device 102 and executed by a processor 302 of the user device 102. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart blocks. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart blocks.

The flowchart blocks support combinations of means for performing the specified functions and combinations of operations for performing the specified functions. It will be understood that one or more blocks of the flowcharts, and combinations of blocks in the flowcharts, can be implemented by special purpose hardware-based computer systems which perform the specified functions, or combinations of special purpose hardware with computer instructions.

CONCLUSION

Many modifications and other embodiments of the disclosure set forth herein will come to mind to one skilled in the art to which these embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A computer-implemented method comprising:
    receiving a communication channel request from a first user;
    establishing a communication channel between a dynamic interface system and a device associated with the communication channel request;
    determining that the first user and a second user are accessing the communication channel via the same device;
    rendering a hybrid interface comprising:
        blended interface data based upon first user parameter data associated with the first user and second user parameter data associated with the second user;
        first personalized interface data based upon the first user parameter data; and
        second personalized interface data based upon the second user parameter data;
    determining that the first user is viewing the first personalized interface data of the hybrid interface;
    determining that the second user is viewing the second personalized interface data of the hybrid interface;
    determining that the first user is attempting to view the second personalized interface data or that the second user is attempting to view the first personalized interface data;
    in response to the second user's attempt to view the first personalized interface data, obscuring view of the first personalized interface data by the second user; and
    in response to the first user's attempt to view the second personalized interface data, obscuring view of the second personalized interface data by the first user.

2. The computer-implemented method according to claim 1, wherein establishing the communication channel further comprises rendering an initial interface based upon the first user parameter data.

3. The computer-implemented method according to claim 2, wherein rendering the hybrid interface comprises modifying the initial interface based on at least one of the blended interface data or the second personalized interface data.

4. The computer-implemented method according to claim 1, further comprising transmitting a portion of the first personalized interface data to a first user device associated with the first user.

5. The computer-implemented method according to claim 1, further comprising transmitting a portion of the second personalized interface data to a second user device associated with the second user.

6. The computer-implemented method according to claim 1, wherein the rendered hybrid interface is displayed to the first user and the second user via the same user device.

7. The computer-implemented method according to claim 1, further comprising:
determining a relative position between the first user and the second user;
determining a change in the relative position; and
modifying the rendered hybrid interface in response to the determined change.

8. The computer-implemented method according to claim 1, further comprising:
determining a change in position of the second user relative the rendered hybrid interface; and
modifying the rendered hybrid interface to ensure that the first personalized interface data remains obscured from view by the second user.

9. The computer-implemented method according to claim 1, wherein:
the first personalized interface data is obscured from view by the second user by dynamically adjusting the polarization, brightness, aspect ratio, and/or contrast of one or more pixels displaying the first personalized interface data; and
the second personalized interface data is obscured from view by the first user by dynamically adjusting the polarization, brightness, aspect ratio, and/or contrast of one or more pixels displaying the second personalized interface data.

10. An apparatus for dynamic user interfaces comprising at least one processor and at least one memory, the at least one memory having computer-code instructed stored thereon that, in execution with the at least one processor, configure the apparatus to:
receive a communication channel request from a first user;
establish a communication channel between a dynamic interface system and a device associated with the communication channel request;
determine that a first user and a second user are accessing the communication channel via the same user device;
render a hybrid interface comprising:
blended interface data based upon first user parameter data associated with the first user and second user parameter data associated with the second user;
first personalized interface data based upon the first user parameter data; and
second personalized interface data based upon the second user parameter data,
determine that the first user is viewing the first personalized interface data of the hybrid interface;
determine that the second user is viewing the second personalized interface data of the hybrid interface;
determine that the first user is attempting to view the second personalized interface data or that the second user is attempting to view the first personalized interface data;
in response to the second user's attempt to view the first personalized interface data, obscure view of the first personalized interface data by the second user; and
in response to the first user's attempt to view the second personalized interface data, obscure view of the second personalized interface data by the first user.

11. The apparatus according to claim 10, further configured to render an initial interface based upon the first user parameter data.

12. The apparatus according to claim 11, further configured to modify the initial interface based on at least one of the blended interface data or the second personalized interface data.

13. The apparatus according to claim 10, further configured to render at least a portion of the first personalized interface data on a first user device associated with the first user.

14. The apparatus according to claim 10, further configured to render at least a portion of the second personalized interface data on a second user device associated with the second user.

15. The apparatus according to claim 10, wherein the rendered hybrid interface is displayed to the first user and the second user via the same user device.

16. The apparatus according to claim 10, further configured to:
determine a change in position of the second user relative the rendered hybrid interface; and
modify the rendered hybrid interface to ensure that the first personalized interface data remains obscured from view by the second user.

17. A non-transitory computer-readable storage medium for dynamic user interfaces, the non-transitory computer-readable storage medium storing instructions that, when executed, cause an apparatus to:
receive a communication channel request from a first user;
establish a communication channel between a dynamic interface system and a device associated with the communication channel request;
determine that the first user and a second user are accessing the communication channel via the same device;
render a hybrid interface comprising:
blended interface data based upon first user parameter data associated with the first user and second user parameter data associated with the second user;
first personalized interface data based upon the first user parameter data; and
second personalized interface data based upon the second user parameter data;
determine that the first user is viewing the first personalized interface data of the hybrid interface;
determine that the second user is viewing the second personalized interface data of the hybrid interface;
determine that the first user is attempting to view the second personalized interface data or that the second user is attempting to view the first personalized interface data;
in response to the second user's attempt to view the first personalized interface data, obscure view of the first personalized interface data by the second user; and
in response to the first user's attempt to view the second personalized interface data, obscure view of the second personalized interface data by the first user.

18. The non-transitory computer-readable storage medium according to claim 17 storing instruction that, when executed, cause the apparatus to render an initial interface based upon the first user parameter data.

19. The non-transitory computer-readable storage medium according to claim 18 storing instruction that, when executed, cause the apparatus to modify the initial interface based on at least one of the blended interface data or the second personalized interface data.

20. The non-transitory computer-readable storage medium according to claim 17 storing instruction that, when executed, cause the apparatus to render at least a portion of the first personalized interface data on a first user device associated with the first user and render at least a portion of the second personalized interface data on a second user device associated with the second user.

21. The non-transitory computer-readable storage medium according to claim 17, wherein the rendered hybrid interface is displayed to the first user and the second user via the same user device.

* * * * *